(12) United States Patent
Harris et al.

(10) Patent No.: US 12,398,755 B2
(45) Date of Patent: Aug. 26, 2025

(54) ANALOG COMPENSATION OF INDUCTIVE SENSORS

(71) Applicant: SKF Canada Limited, Scarborough (CA)

(72) Inventors: Timothy Andrew Harris, Calgary (CA); Udell So, Calgary (CA); Gregory W. Smith, Calgary (CA)

(73) Assignee: SKF Canada Limited, Scarborough (CA)

( * ) Notice: Subject to any disclaimer, the term of this patent is extended or adjusted under 35 U.S.C. 154(b) by 216 days.

(21) Appl. No.: 18/462,143

(22) Filed: Sep. 6, 2023

(65) Prior Publication Data

US 2025/0075735 A1    Mar. 6, 2025

(51) Int. Cl.
*F16C 32/04*    (2006.01)
*G01D 5/20*    (2006.01)

(52) U.S. Cl.
CPC ....... *F16C 32/0451* (2013.01); *G01D 5/2006* (2013.01)

(58) Field of Classification Search
CPC .............. F16C 32/0451; F16C 32/0442; F16C 32/0446; F16C 32/0489; G01D 5/2006
USPC ......................................................... 310/90.5
See application file for complete search history.

(56) References Cited

U.S. PATENT DOCUMENTS

| 6,323,614 B1 * | 11/2001 | Palazzolo | .............. | G05B 19/29 318/560 |
| 2016/0313143 A1 * | 10/2016 | So | .............................. | G01P 3/44 |
| 2025/0075735 A1 * | 3/2025 | Harris | ................. | F16C 32/0446 |

* cited by examiner

*Primary Examiner* — Ahmed Elnakib
(74) *Attorney, Agent, or Firm* — Stinson LLP

(57) ABSTRACT

A magnetic bearing assembly having a signal conditioning circuit that includes an offset generator for adding a digitally controllable analog offset to compensate for displacement error in unbalanced inductive sensors.

20 Claims, 3 Drawing Sheets

ANALOG COMPENSATION OF INDUCTIVE SENSORS

FIELD

Aspects of the present disclosure relate to sensors and, more particularly, to inductive sensors for use with an active magnetic bearing system.

BACKGROUND

An active magnetic bearing system uses a set of actuators (i.e., magnetic bearings) driven by a control unit to levitate a rotatable member (e.g., a shaft or rotor). To ensure stable magnetic levitation, sensors provide continuous displacement measurements to the control unit. Sensor technologies include capacitive, optical, magnetic, and electromagnetic. In an inductive sensor, which is one type of electromagnetic sensor, an external oscillator drives the current flowing in an inductor coil. When the levitated member changes its position, the inductance changes accordingly. This variation is converted into a voltage and adopted in the control loop for the magnetic levitation.

Theoretically, the output of the sensors should be zero when the levitated member is perfectly centered, i.e., at zero displacement. Practically, this is not the case due to manufacturing and material imperfections. The control unit must account for this error, sometimes referred to as offset error or quadrature error or zero displacement error. Conventional signal conditioning and processing techniques used to solve the problem of zero displacement error are: quadrature compensation implemented in hardware, demodulation angle modification, and digital offset compensation implemented in software. Unfortunately, hardware modifications require hands-on tuning and cannot be performed remotely, and digital compensation reduces signal resolution due to the need to accept reduced full-scale signal range at the analog-to-digital converter (ADC) input to accommodate the offset.

SUMMARY

Aspects of the present disclosure include processing the signal output from an inductive sensor used to sense the position of a rotor or the like in a magnetic bearing assembly. In this regard, a programmable direct current (DC) offset is added to a sensor output signal $V_{SENSE}$ to ensure zero output at zero displacement. Aspects of the present disclosure further compensate for imbalances present in the magnetic bearing inductive sensors due to manufacturing, material variance, etc. and ensures high sensor resolution.

In an aspect, a sensor assembly for use with a magnetic bearing system comprises first and second inductive sensors positioned spaced apart from a levitated body. The first inductive sensor is configured for sensing a first air gap and the second inductive sensor is configured for sensing a second air gap. The assembly also includes a plurality of drive circuits electrically connected to the inductive sensors. Each of the drive circuits is configured for providing an input signal to a respective one of the inductive sensors such that the inductive sensors each generate an output signal representative of the air gap. An interconnection electrically connecting the inductive sensors to each other combines the output signals from the sensors to output a displacement signal. The output signals from the inductive sensors cancel each other at the interconnection when the levitated body is positioned in a predetermined position such that the first and second air gaps are equal to each other. A non-zero displacement signal at the interconnection when the levitated body is in the predetermined position represents a displacement error. The assembly further comprises a signal conditioning circuit electrically connected to the interconnection. The signal conditioning circuit receives the displacement signal and includes an offset generator for adding an analog offset to compensate for the displacement error. The signal conditioning circuit is configured for generating a position signal representative of a position of the levitated body relative to the predetermined position as a function of the compensated displacement signal with the analog offset.

In another aspect, a magnetic bearing assembly comprises a plurality of active magnetic bearings configured for levitating a rotatable member, which is rotatable about a central axis. The assembly includes a plurality of inductive sensors each associated with a respective one of the magnetic bearings and positioned radially outwardly from the central axis and spaced apart from the rotatable member. The sensors are configured for sensing an air gap between the inductive sensor and the rotatable member. The assembly also includes a plurality of drive circuits electrically connected to the inductive sensors. Each of the drive circuits is configured for providing an input signal to a respective one of the inductive sensors such that the inductive sensors each generate an output signal representative of the air gap. An interconnection electrically connecting the inductive sensors to each other combines the output signals from the sensors to output a displacement signal. The output signals from the inductive sensors cancel each other at the interconnection when the rotatable member is centered on the central axis and a non-zero displacement signal at the interconnection when the rotatable member is centered on the central axis represents a displacement error. The assembly further comprises a signal conditioning circuit electrically connected to the interconnection. The signal conditioning circuit receives the displacement signal and includes an offset generator for adding an analog offset to compensate for the displacement error. The signal conditioning circuit is configured for generating a position signal representative of a radial position of the rotatable member relative to the central axis as a function of the displacement signal with the offset. A magnetic bearing controller of the assembly receives the position signal for controlling the active magnetic bearings to minimize radial displacement of the rotatable member from the central axis.

In yet another aspect, a method of controlling a magnetic bearing assembly comprises providing input signals to a plurality of inductive sensors. Each of the inductive sensors is associated with a respective one of a plurality of active magnetic bearings configured for levitating a rotatable member, which is rotatable about a central axis. The sensors are positioned radially outwardly from the central axis and spaced apart from the rotatable member. The method includes sensing an air gap between each of the inductive sensors and the rotatable member and receiving an output signal representative of the sensed air gap from each of the inductive sensors. The method also includes combining the output signals from each of the inductive sensors at an electrical interconnection to output a displacement signal. The output signals from the inductive sensors cancel each other at the interconnection when the rotatable member is centered on the central axis and a non-zero displacement signal at the interconnection when the rotatable member is centered on the central axis represents a displacement error. The method further comprises receiving the displacement signal and adding an analog offset thereto to compensate for the displacement error, generating a position signal representative of a radial position of the rotatable member relative to the central axis as a function of the compensated displacement signal with the offset, and controlling the active magnetic bearings to minimize radial displacement of the rotatable member from the central axis as a function of the position signal.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
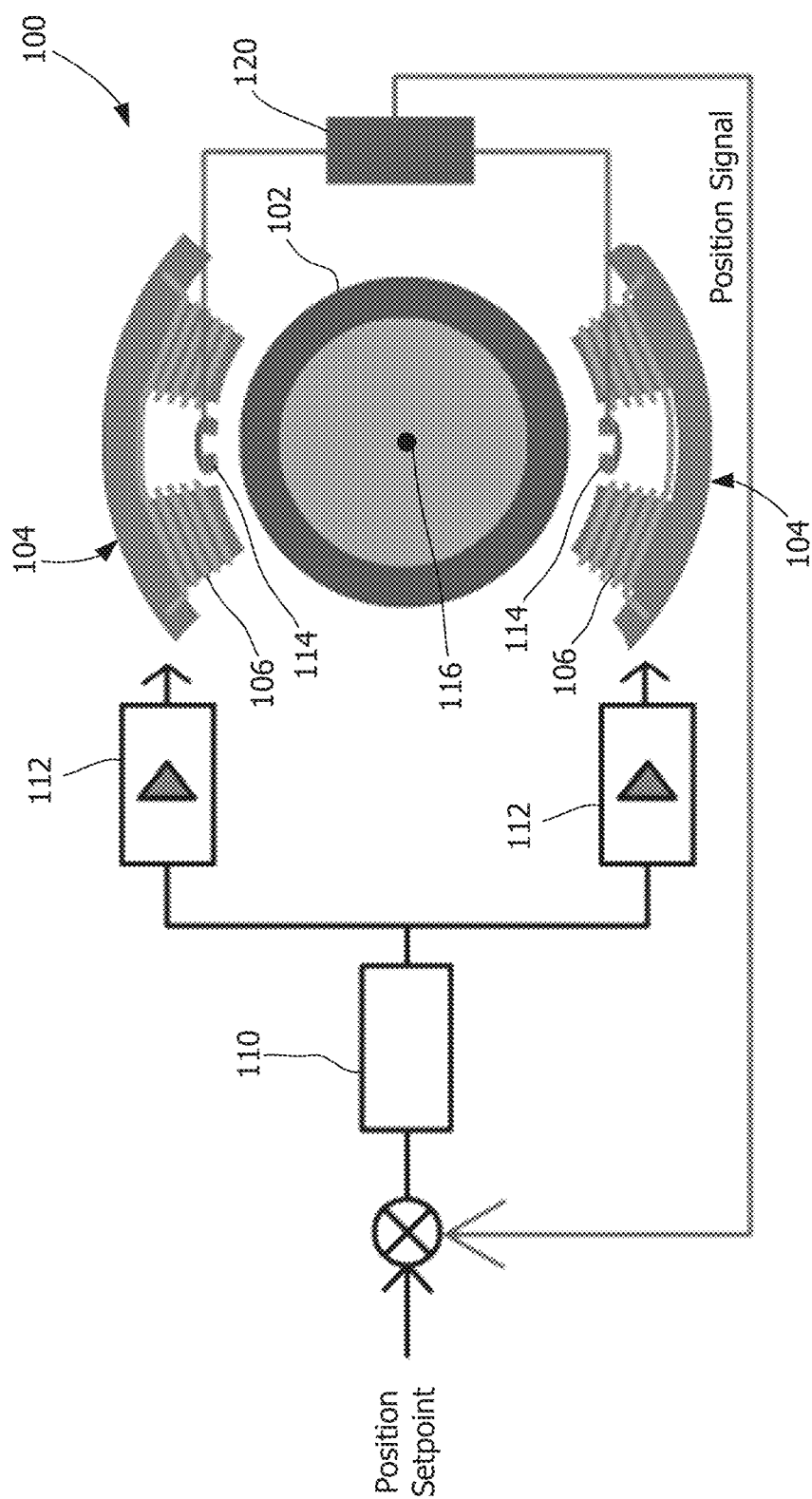
FIG. 1 is a block diagram illustrating an active magnetic bearing system according to an embodiment.

Referring to FIG. 1, an active magnetic bearing system 100 levitates a rotatable member 102 and maintains it in position by applying controlled electromagnetic forces on the member 102 in radial and axial directions. A radial magnetic bearing assembly 104 comprises a plurality of electromagnetic actuators. In FIG. 1, the actuators take the form of controllable electromagnets 106, usually made of a stack of laminations with copper coils wound around the north and south poles. The rotating member 102 is often referred to as a rotor and the radial magnetic bearing assembly 104 is often referred to as a stator.

A levitation controller 110, or magnetic bearing controller, applies current to the coils of electromagnets 106 via power amplifiers 112 to produce attractive forces on laminated iron rotor parts so to levitate rotatable member 102 inside bearing assembly 104. The clearance or magnetic air gap between bearing assembly 104 and rotatable member 102 is, for example, 0.5 to 1.0 mm, depending on the application. For this reason, there is no contact friction or component wear and, thus, lubrication is not required.

To achieve stable levitation of rotatable member 102 in active magnetic bearing system 100, the current in the electromagnets 106 is continuously adjusted to maintain rotatable member 102 in the desired position. This position is constantly measured using a plurality of position sensors 114, which passes information to controller 110, which in turn adjusts the current (e.g., by applying control voltage at the inputs of power amplifiers 112).

FIG. 1 further illustrates the position sensors 114 for measuring any radial displacements of member 102 relative to a central axis 116 of bearing assembly 104. As described above, the output of the sensors 114 should be zero when the levitated member 102 is perfectly centered, i.e., at zero displacement. Because this is not usually the case due to manufacturing and material imperfections, the controller 110 must account for this zero displacement error. A position signal conditioning circuit 120 provides a position signal representative of the displacement of rotatable member 102 relative to the central axis 116 to controller 110 for use in controlling active bearing assembly 104 to levitate rotatable member 102. Although not shown, those skilled in the art are familiar with the use of monitoring systems for active magnetic bearing system 100. Such monitoring systems provide real time information on shaft position, vibrations, currents (loads), temperatures, alarms, safety management, etc. The controller 110 is responsive to a number of parameters for controlling levitation of rotatable member 102.

Figure 2:
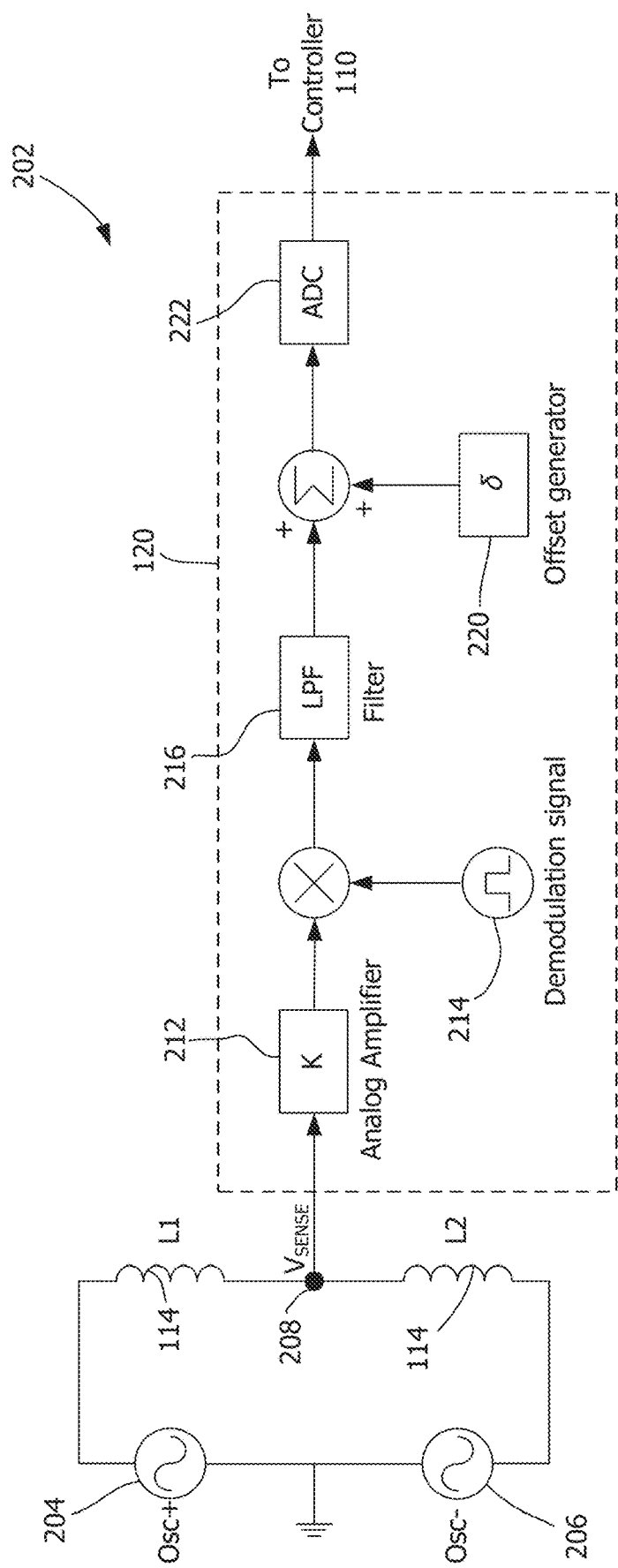
FIG. 2 illustrates an offset compensation circuit for use with the active magnetic bearing system of FIG. 1 according to an embodiment.

Aspects of the present disclosure compensate for zero displacement error by adding a DC offset to the analog measurement circuitry, which zeroes the zero mechanical displacement signal output. Referring now to FIG. 2, inductive sensors 114 are part of a sensor assembly 202, which includes first and second oscillator circuits 204, 206, respectively, electrically connected through inductive sensors 114 (illustrated as inductors L1 and L2, respectively) at an interconnection 208. The first oscillator circuit 204 is electrically connected to L1 and is configured to provide a first input signal to a first one of the sensors 114. The second oscillator circuit 206 is electrically connected to L2 and is configured to provide a second input signal to a second one of the sensors 114. The oscillator circuits 204, 206 are arranged or configured such that the second input signal is about one hundred eighty degrees (180°) out-of-phase of the first input signal. For this reason, the sensor output signals from the two sensors 114 illustrated in FIG. 2 are also about one hundred eighty degrees (180°) out-of-phase of each other. The interconnection 208 is electrically connected to the position signal conditioning circuit 120 for communicating a sensor output signal $V_{SENSE}$, or displacement signal. The interconnection 208 of FIG. 2 is preferably configured to combine the output signals from the two sensors 114 such that their output signals cancel each other when a first air gap or spacing distance between the first of the two sensors 114 and rotatable member 102 is equal to a second air gap or spacing distance between the second of the two sensors 114 and rotatable member 102.

In an embodiment, the sensor assembly 202 of FIG. 2 includes oscillator circuits 204, 206 driving sensors 114 to produce the sensor output signal $V_{SENSE}$ at interconnection 208. The output signal $V_{SENSE}$ which feeds into position signal conditioning circuit 120. In the illustrated embodiment, position signal conditioning circuit 120 includes an analog amplifier 212 for increasing or decreasing the gain of $V_{SENSE}$. The oscillators 204, 206 of each of the drive circuits provides a suppressed carrier for modulating $V_{SENSE}$. Following the amplifier 212, position signal conditioning circuit 120 includes a demodulator 214 for demodulating $V_{SENSE}$, resulting in a demodulated displacement signal. The position signal conditioning circuit 120 of FIG. 2 further conditions the demodulated displacement signal using a low pass filter 216.

After demodulation and filtering, an offset generator 220 of position signal conditioning circuit 120 adds a variable DC output to the displacement signal to compensate for any observed zero displacement error. To maximize sensor resolution, the offset generator 220 adds the analog offset before an analog-to-digital converter (ADC) 222 converts the compensated displacement signal to a digital position signal, which is then output to the levitation controller 110. In an embodiment, offset generator 220 comprises at least one of a digital-to-analog converter (DAC), a digital potentiometer, and a tunable resistor. In other words, the variable offset is generated using a DAC but it can also be generated using different methods, including using a digital potentiometer or manual resistor tuning. It is important to compensate in the analog circuitry to maximize the sensor resolution being read by the ADC 222. In an example operation, inductive sensors 114, driven by oscillators 204, 206, generate and provide analog sensor data to position signal conditioning circuit 120. In turn, position signal conditioning circuit 120 converts and processes the analog sensor data into the digital position signal for use by controller 110 to control active magnetic bearing assembly 104.

Advantageously, adding the analog output before converting to a digital signal maximizes the input range of ADC 222, which results in increased sensor resolution. Also, the DC offset compensation is easy to control and extremely precise. The offset generator 220 (e.g., embodied by a DAC) is digitally controllable while providing an analog offset. This permits easily tuning the circuit to correct any zero displacement error locally or remotely.

Figure 3:
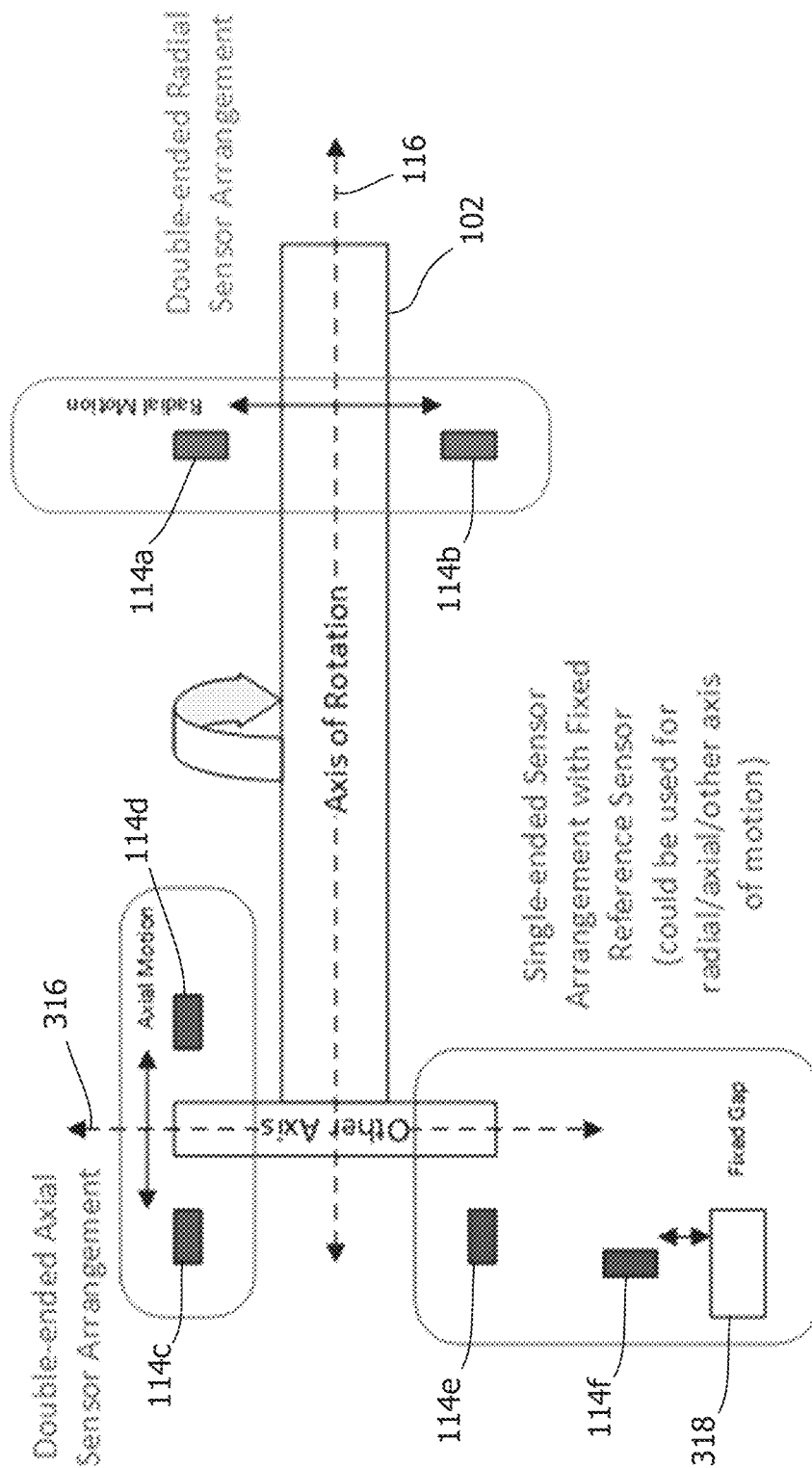
FIG. 3 illustrates alternative sensor positions according to an embodiment.

FIG. 3 illustrates examples of alternative placements of inductive sensors 114. As shown, sensors 114a, 114b comprise a double-ended radial sensor arrangement for measuring position of the levitated rotatable member 102 relative to axis 116. The sensors 114c, 114d comprise a double-ended axial sensor arrangement for measuring position of the levitated rotatable member 102 relative to a different axis 316 (shown perpendicular to axis 116). The sensor 114e comprises a single-ended sensor arrangement for measuring position of the levitated rotatable member 102 relative to the axis 316 (or the axis 116) and the sensor 114f comprises a reference sensor for measuring position of the levitated rotatable member 102 relative to a fixed body 318. Those skilled in the art will recognize that aspects of the present disclosure may be applied to different physical arrangements where the sensors 114 are spaced apart from the shaft 102 from an axis that is not necessarily the axis of rotation 116.

The following is an example of offset compensation according to aspects of the present disclosure. Those skilled in the art familiar with conventional quadrature compensation will recognize that the digital offset compensation described herein produces the same net result as quadrature compensation.

In the example, the inductive sensor output is demodulated in phase with the excitation voltage, the analog offset is added, and then the compensated sensor output is low pass filtered and converted from analog to digital. The procedure for tuning the offset compensation includes: place rotor at the zero position; read output voltage of the low pass filter; and add compensation equal and opposite to the low pass filter output. If the sensors are balanced, no compensation is needed and the offset compensation value is 0. The sensor output is 0V representing zero displacement.

Imbalanced sensors, on the other hand, require compensation to achieve 0V sensor output at zero displacement. To compensate an imbalanced sensor configuration, a DC offset is added to the lowpass filter output. Imbalanced sensors can be simulated by raising or lowering simulated sensor inductance values to see what the comparative response is to a change in position with imbalanced sensors. For comparison, the amount of offset from changing the inductance of either L1 (top) or L2 (bottom) is shown in Tables I and II, below.

TABLE I

| Test | L1 (µH) | L2 (µH) | Offset Compensation |
|---|---|---|---|
| 0 (Calibration) | 1.2 | 1 | −0.0665 |
| 1 | 2 | 1 | −0.0956 |
| 2 | 4 | 1 | −0.233 |
| 3 | 10 | 1 | −1.10 |
| 4 | 50 | 1 | −7.34 |
| 5 | 30 | 1 | −5.10 |
| 6 | 1 | 10 | 1.64 |
| 7 | 1 | 30 | 7.71 |

TABLE II

| Test | L1 (µH) | L2 (µH) | Offset Compensation |
|---|---|---|---|
| 0 (Calibration) | 1 | 10 | −0.00552 |
| 1 | 1 | 20 | 3.25 |
| 2 | 1 | 30 | 6.11 |
| 3 | 1 | 1 | −1.70 |
| 4 | 10 | 1 | −2.75 |
| 5 | 20 | 1 | −4.88 |

Ideal offset compensation (no phase shift in sensor output) is determined as follows:
Take ideal sensor output to be $S_{out}$ $$S_{out} = A \sin(\omega t)$$

Demodulated output is $D_{out}$ $$F_{out} = A \sin(\omega t) * \sin(\omega t)$$

$$D_{out} = A\left(\frac{1}{2} - \frac{\cos(2\omega t)}{2}\right)$$

Take offset value to be $$C = \frac{B}{2}$$

Sum of offset value and demodulated output is $O_{out}$ $$O_{out} = A\left(\frac{1}{2} - \frac{\cos(2\omega t)}{2}\right) + C$$

After low pass filter and substituting $$C = \frac{B}{2}$$

$$LPF_{out} = \frac{1}{2}(A + B)$$

Non-ideal offset compensation (phase shift in sensor output) is determined as follows:
If sensor is not ideal $$S_{out} = A\sin(\omega t + \varphi)$$

From sum/difference identity $$S_{out} = A(\alpha \sin(\omega t) + \beta \cos(\omega t))$$

After demodulation $$D_{out} = A(\alpha \sin^2(\omega t) + \beta \cos(\omega t)\sin(\omega t))$$

-continued $$D_{out} = A\alpha\left(\frac{1}{2} - \frac{\cos(2\omega t)}{2}\right) + \frac{A\beta}{2}\sin(2\omega t)$$

After adding offset value $$C = \frac{B}{2}$$

$$D_{out} = A\alpha\left(\frac{1}{2} - \frac{\cos(2\omega t)}{2}\right) + \frac{A\beta}{2}\sin(2\omega t) + C$$

After low pass filter and substituting $$C = \frac{B}{2}$$

$$LPF_{out} = \frac{1}{2}(A\alpha + B)$$

In operation, processors, computers and/or servers may execute processor-executable instructions (e.g., software, firmware, and/or hardware) such as those illustrated herein to implement aspects of the disclosure. The processor-executable instructions may be organized into one or more processor-executable components or modules on a tangible processor readable storage medium.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

When introducing elements of the embodiments, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure are not limited in its application to the details of construction and the arrangement of components set forth in the following description or illustrated in the drawings. The aspects of the disclosure are capable of other embodiments and of being practiced or carried out in various ways. Also, it will be understood that the phraseology and terminology used herein is for the purpose of description and should not be regarded as limiting.

It will be apparent that modifications and variations are possible without departing from the scope defined in the appended claims. As various changes could be made in the above constructions and methods without departing from the scope of the present disclosure, it is intended that all matter contained in the above description and shown in the accompanying drawings shall be interpreted as illustrative and not in a limiting sense.

In view of the above, it will be seen that several advantages of the aspects of the disclosure are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A sensor assembly for use with a magnetic bearing system, the magnetic bearing system configured for levitating a body, the sensor assembly comprising:

first and second inductive sensors spaced apart from the levitated body, the first inductive sensor configured for sensing a first air gap and the second inductive sensor configured for sensing a second air gap;

a plurality of drive circuits electrically connected to the first and second inductive sensors, each of the drive circuits configured for providing an input signal to a respective one of the first and second inductive sensors such that the first inductive sensor generates an output signal representative of the first air gap and the second inductive sensor generates an output signal representative of the second air gap;

an interconnection electrically connecting the first and second inductive sensors to each other and combining the output signals therefrom to output a displacement signal, wherein the output signals from the first and second inductive sensors cancel each other at the interconnection when the levitated body is positioned in a predetermined position such that the first and second air gaps are equal to each other, and wherein a non-zero displacement signal at the interconnection when the levitated body is positioned in the predetermined position represents a displacement error; and a signal conditioning circuit electrically connected to the interconnection, the signal conditioning circuit receiving and responsive to the displacement signal and including an offset generator for adding an analog offset to compensate for the displacement error, the signal conditioning circuit configured for generating a position signal representative of a position of the levitated body relative to the predetermined position as a function of the compensated displacement signal with the analog offset.

2. The sensor assembly of claim 1, wherein the first air gap represents a distance from the first sensor to the levitated body and the second air gap represents a distance from the second sensor to a fixed body.

3. The sensor assembly of claim 1, wherein each of the drive circuits comprises an oscillator.

4. The sensor assembly of claim 3, wherein the drive circuits comprise a first drive circuit and a second drive circuit, and wherein the oscillator of the first drive circuit is 180° out of phase with the oscillator of the second drive circuit.

5. The sensor assembly of claim 3, wherein the oscillator of each of the drive circuits provides a suppressed carrier for modulating the displacement signal and wherein the signal conditioning circuit comprises a demodulator for demodulating the displacement signal before the analog offset is added.

6. The sensor assembly of claim 1, wherein the signal conditioning circuit comprises an analog-to-digital converter (ADC) configured for converting the compensated displacement signal from analog to digital after the analog offset is added to the displacement signal, and wherein the position signal output from the signal conditioning circuit is a digital signal.

7. The sensor assembly of claim 1, wherein the offset generator comprises at least one of a digital-to-analog converter (DAC), a digital potentiometer, and a tunable resistor.

8. A magnetic bearing assembly comprising:
   a plurality of active magnetic bearings configured for levitating a rotatable member, the rotatable member rotatable about a central axis;
   a plurality of inductive sensors each associated with a respective one of the magnetic bearings, each of the inductive sensors positioned radially outwardly from the central axis and spaced apart from the rotatable member and configured for sensing an air gap between the inductive sensor and the rotatable member;
   a plurality of drive circuits electrically connected to the inductive sensors, each of the drive circuits configured for providing an input signal to a respective one of the inductive sensors such that the inductive sensors each generate an output signal representative of the air gap;
   an interconnection electrically connecting the inductive sensors to each other and combining the output signals therefrom to output a displacement signal, wherein the output signals from the inductive sensors cancel each other at the interconnection when the rotatable member is centered on the central axis, and wherein a non-zero displacement signal at the interconnection when the rotatable member is centered on the central axis represents a displacement error;
   a signal conditioning circuit electrically connected to the interconnection, the signal conditioning circuit receiving and responsive to the displacement signal and including an offset generator for adding an analog offset to compensate for the displacement error, the signal conditioning circuit configured for generating a position signal representative of a radial position of the rotatable member relative to the central axis as a function of the displacement signal with the offset; and
   a magnetic bearing controller receiving and responsive to the position signal for controlling the active magnetic bearings to minimize radial displacement of the rotatable member from the central axis.

9. The magnetic bearing assembly of claim 8, wherein the displacement signal represents an amount of displacement of the rotatable member from the central axis.

10. The magnetic bearing assembly of claim 8, wherein each of the drive circuits comprises an oscillator.

11. The magnetic bearing assembly of claim 10, wherein the drive circuits comprise a first drive circuit and a second drive circuit, and wherein the oscillator of the first drive circuit is 180° out of phase with the oscillator of the second drive circuit.

12. The magnetic bearing assembly of claim 10, wherein the oscillator of each of the drive circuits provides a suppressed carrier for modulating the displacement signal and wherein the signal conditioning circuit comprises a demodulator for demodulating the displacement signal before the analog offset is added.

13. The magnetic bearing assembly of claim 8, wherein the signal conditioning circuit comprises an analog-to-digital converter (ADC) configured for converting the compensated displacement signal from analog to digital after the analog offset is added to the displacement signal, and wherein the position signal output from the signal conditioning circuit is a digital signal.

14. The magnet bearing assembly of claim 8, wherein the offset generator comprises at least one of a digital-to-analog converter (DAC), a digital potentiometer, and a tunable resistor.

15. A method of controlling a magnetic bearing assembly, the magnetic bearing assembly including a plurality of active magnetic bearings configured for levitating a rotatable member, the rotatable member rotatable about a central axis, the method comprising:
   providing input signals to a plurality of inductive sensors, wherein each of the inductive sensors is associated with a respective one of the magnetic bearings and positioned radially outwardly from the central axis and spaced apart from the rotatable member;
   sensing an air gap between each of the inductive sensors and the rotatable member;
   receiving an output signal representative of the sensed air gap from each of the inductive sensors;
   combining the output signals from each of the inductive sensors at an electrical interconnection to output a displacement signal, wherein the output signals from the inductive sensors cancel each other at the interconnection when the rotatable member is centered on the central axis, and wherein a non-zero displacement signal at the interconnection when the rotatable member is centered on the central axis represents a displacement error;
   receiving the displacement signal and adding an analog offset thereto to compensate for the displacement error;
   generating a position signal representative of a radial position of the rotatable member relative to the central axis as a function of the compensated displacement signal with the offset; and
   controlling the active magnetic bearings to minimize radial displacement of the rotatable member from the central axis as a function of the position signal.

16. The method of claim 15, wherein the displacement signal represents an amount of displacement of the rotatable member from the central axis.

17. The method of claim 15, further comprising providing a plurality of drive circuits for providing the input signals to the plurality of inductive sensors, wherein each of the drive circuits comprises an oscillator.

18. The method of claim 17, wherein the drive circuits comprise a first drive circuit and a second drive circuit, and wherein the oscillator of the first drive circuit is 180° out of phase with the oscillator of the second drive circuit.

19. The method of claim 15, further comprising providing a suppressed carrier for modulating the displacement signal and demodulating the displacement signal before adding the analog offset.

20. The method of claim 15, further comprising converting the compensated displacement signal from analog to digital after adding the analog offset to the displacement signal, and wherein the position signal comprises a digital signal.

* * * * *